No. 760,221. PATENTED MAY 17, 1904.
W. A. LOUD.
BALL BEARING DEVICE.
APPLICATION FILED JULY 6, 1903.
NO MODEL.

Witnesses:
Inventor:
Waldo A. Loud

No. 760,221. Patented May 17, 1904.

UNITED STATES PATENT OFFICE.

WALDO A. LOUD, OF SPRINGFIELD, MASSACHUSETTS.

BALL-BEARING DEVICE.

SPECIFICATION forming part of Letters Patent No. 760,221, dated May 17, 1904.

Application filed July 6, 1903. Serial No. 164,337. (No model.)

*To all whom it may concern:*

Be it known that I, WALDO A. LOUD, a citizen of the United States of America, and a resident of Springfield, in the county of Hampden and State of Massachusetts, have invented certain new and useful Improvements in Ball-Bearing Devices, of which the following is a full, clear, and exact description.

This invention relates to improvements in ball-bearing appliances in which there is an arrangement of a rotary part having an adjustable cone thereon, a frame or supporting part, relatively to which the rotary part has its movement, provided with a ball-race having balls therein and means for changing and adjusting the position of the cone and for holding it positively locked in any given adjusted position for nicety of its action against the balls in the race.

The device is specially designed for and is capable of the most advantageous utilization in a lawn-mower.

The invention consists in the combination, with a stationary portion having a ball-race and balls therein, of a revoluble body or part and a support therefor axially arranged relatively thereto and provided externally with screw-threads, an internally-threaded cone-ended member screw-engaging on said axially-arranged support and having its tapered end adjacent the balls in said ball-race and a screw threading through the revoluble body parallel with its axis and having an endwise bearing against the end of said internally-threaded cone-sleeve.

The invention is shown as exemplified in the accompanying drawings, in which—

Figure 1:
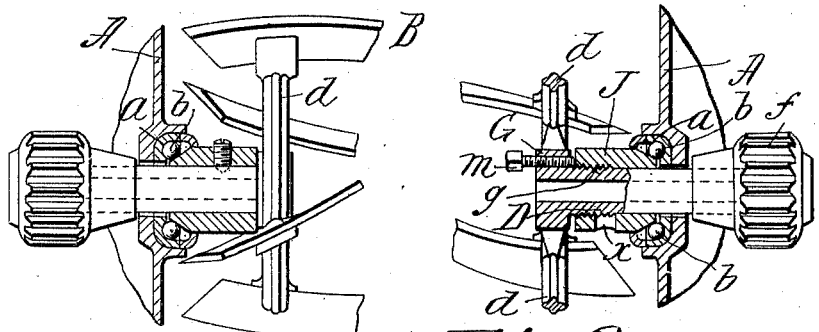
Figure 2:
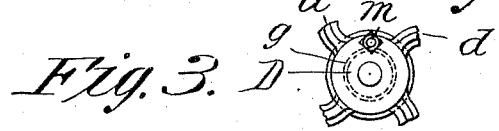
Figure 3:
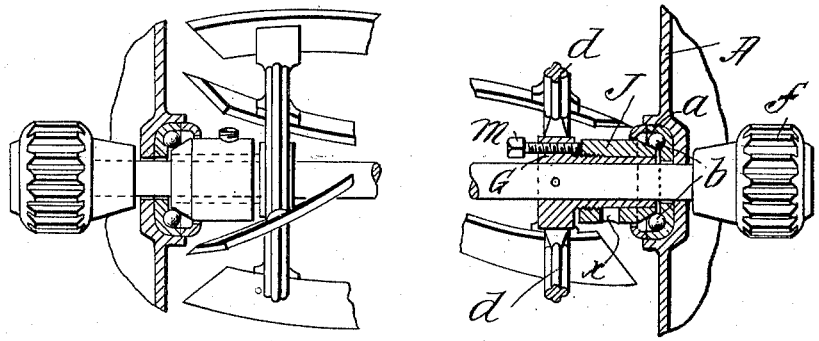
Figure 4:
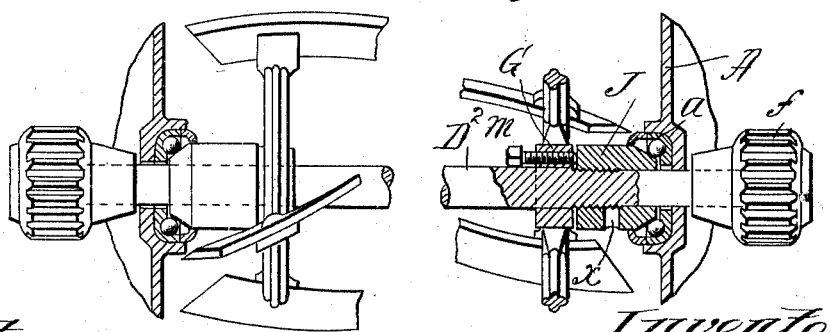

Figure 1 is substantially a partial longitudinal sectional view on the plane of the axis through the cutter and through opposite side portions of the lawn-mower frame, showing the preferred manner of carrying out the aforesaid invention. Fig. 2 is a partial face view as taken at the inner side of the central portion of one of the heads of the cutter. Figs. 3 and 4 are views substantially similar to Fig. 1, but showing immaterial modifications which may be utilized in the arrangements of the parts pertaining to the invention.

Similar characters of reference designate substantially corresponding parts in all of the views.

In the drawings, A A represent the opposite cheeks or side members of the lawn-mower frame, which have at their inner sides the ball-races $a$, in which are the balls $b$.

B indicates the cutter, comprising the blades of helical form, which are secured to the outer ends of arms $d$, formed as parts of and outwardly extended from the axially-located support D for the cutter, which in Fig. 1 is shown as in the form of an outwardly-extending hub protruding through the aperture concentrically within the ball-race and having the usual gear-wheel $f$ thereon, through means of which the cutter is rotated by further gearing connected with the roller of the lawn-mower in the usual manner, such gear having, as understood, the well-known pawl internally coacting therewith, so that when such gear is turned in one direction it will drive the cutter around and so that when the gear is turned in the opposite direction it will be non-effective relatively to the cutter.

The aforementioned concentric endwise-extended support for the cutter-head comprising the hub D, integrally cast as a part of the head, has externally thereof the screw-threads $g$, between the outer face of the head G and the portion of such extended hub which protrudes through the opening within the ball-race, and screw-engaging on this threaded portion $g$ is a cone-ended sleeve J, the end portion thereof bearing against and receiving support concentrically by the balls in the ball-race, and a screw $m$ is by its threaded shank screw-engaged through the wall or web of the one end head of the cutter, the outwardly-protruding end of the screw having its bearing against the inner end of the cone-sleeve J. By setting the opposite end cone of the cutter within and against the adjacent balls and by turning the right-hand-end cone-sleeve D, as may be done by a spanner or other implement engaging in the socket $x$ therefor, such sleeve may have its cone end brought properly to bearing within the adjacent concentric set of balls, and now by turning the screw $m$, the squared head of which for facilitating such turning being at the inner side of the right-hand head of the cutter, such screw may exert a crowding bearing against the internally-threaded cone-sleeve D in a line parallel with its axis to cause the screw-threads of the sleeve to be crowded and bound against the screw-threads on the supporting part, whereby the cone-sleeve may not be accidentally displaced from its nicely-adjusted position.

In Fig. 3 the only difference in the construction and arrangement indicated from that shown in Fig. 1 will be seen to consist in the provision of a central shaft extending through the tubular hubs of the cutter-heads and pinned or keyed thereto, the gear-wheels $f$ being applied on such shaft instead of on the sleeve extensions of the heads of the cutter, and in Fig. 4 the central support for the heads of the cutter is constituted by the central shaft $D^2$, to which the cutter-heads are understood as pinned or keyed, such shaft having the external screw-threads, engaging with which is the internally-threaded cone-sleeve, such cone-sleeve after acquiring its longitudinal adjustment, through means of rotational movements imparted thereto, being bound and confined in such adjustment by the endwise engagement thereagainst of the screw $m$, which in all cases is screw-thread engaged through the wall or web of the cutter-head near its middle portion in a line parallel with the axis of the cutter.

Having thus described my invention, what I claim, and desire to secure by Letters Patent, is—

In a ball-bearing device of the type set forth, a stationary member provided with an outwardly and laterally curved rim providing a ball-race, balls carried therein, a revoluble member provided with a cylindrical plain portion and having screw-threads formed exteriorly upon a part of said cylindrical portion, an adjustable cone member provided with interior threads adapted to engage with the threaded portion of the revoluble member, provided with a socket therein to receive a tightening instrument, and a screw mounted within an opening formed in said revoluble member, said screw projecting parallel with the cylindrical portion of said member, and adapted to engage with the rear face of the cone member, whereby said last-named member may be forced into locked engagement with the threads of the revoluble member, substantially as described.

Signed by me at Springfield, Massachusetts, in presence of two subscribing witnesses.

WALDO A. LOUD.

Witnesses:
WM. S. BELLOWS,
A. V. LEAHY.